(12) United States Patent
Mankovich

(10) Patent No.: US 7,089,578 B2
(45) Date of Patent: Aug. 8, 2006

(54) APPARATUS AND METHOD FOR DYNAMICALLY UPDATING A VIEWER PROFILE IN A DIGITAL TELEVISION DEVICE

(75) Inventor: Nicholas J. Mankovich, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1068 days.

(21) Appl. No.: 09/967,873

(22) Filed: Sep. 29, 2001

(65) Prior Publication Data

US 2003/0066069 A1 Apr. 3, 2003

(51) Int. Cl.
*H04N 7/173* (2006.01)

(52) U.S. Cl. .......................................... 725/90; 725/46
(58) Field of Classification Search ................... 725/90, 725/46
See application file for complete search history.

(56) References Cited

U.S. PATENT DOCUMENTS

| | | | | |
|---|---|---|---|---|
| 5,945,988 | A * | 8/1999 | Williams et al. ............ | 715/747 |
| 6,543,052 | B1 * | 4/2003 | Ogasawara .................. | 725/60 |
| 2002/0120935 | A1 * | 8/2002 | Huber et al. .................. | 725/60 |
| 2004/0078809 | A1 * | 4/2004 | Drazin ......................... | 725/34 |
| 2004/0237106 | A1 * | 11/2004 | Brule .......................... | 725/46 |
| 2005/0028207 | A1 * | 2/2005 | Finseth et al. ................ | 725/46 |
| 2005/0076367 | A1 * | 4/2005 | Johnson et al. ............... | 725/58 |

* cited by examiner

*Primary Examiner*—Vivek Srivastava

(57) ABSTRACT

There is disclosed an apparatus for updating a viewer profile stored in a digital television device. The apparatus comprises: 1) receiver circuitry for receiving audio-video data packets associated with a plurality of incoming television signals and extracting therefrom at least one data request data packet containing a first data request operable to retrieve a first requested profile datum from the stored viewer profile; and 2) an update controller for receiving the at least one data request data packet from the receiver circuitry and determining if the first requested profile datum is present in the viewer profile, wherein the update controller, in response to a determination that the first requested profile datum is not present in the stored viewer profile, displays on an associated television screen information related to the first requested profile datum.

11 Claims, 4 Drawing Sheets

APPARATUS AND METHOD FOR DYNAMICALLY UPDATING A VIEWER PROFILE IN A DIGITAL TELEVISION DEVICE

TECHNICAL FIELD OF THE INVENTION

The present invention is directed, in general, to digital television systems and, more specifically, to an apparatus for dynamically updating a viewer profile in an interactive digital television.

BACKGROUND OF THE INVENTION

In modern television broadcast systems, a wide variety of interactive digital television (DTV) content is broadcast to the home from broadcast facilities. The manner in which the DTV content is used and displayed by the viewer's television varies according to profile information known about the viewer. This profile information is usually stored somehow inside of a terminal unit, such as a television set, a set-top box (STB), a personal computer (PC), or similar device.

Many digital television systems have shown how content can be tailored within the terminal device according to this stored information. For example, some digital television systems display local merchant addresses according to a postal code stored during setup of the terminal unit. Some digital television systems are capable of providing directed advertising, in which a multiplexed group of advertisements are broadcast and the one displayed is selected by the terminal unit according to some demographic information (e.g., viewer age) stored in the viewer profile in the terminal unit. Other examples include game shows, home shopping opportunities, and the like, all of which have an element of choice that is made in the terminal unit according to some local data.

However, there are problems associated with digital television content selection by the terminal unit. Specifically, there are no explicit standards regarding what may be stored in the terminal unit and how the downloaded software accompanying the digital television content (e.g., ATSC/DASE or DVB/MIHP Java applications) might access the stored viewer profile data (also called "personalization data"). In essence, there is a "chicken-or-the-egg" problem. There will not be a strong push for standardizing viewer profile (personalized) data until there is a sufficient amount of interactive digital television content included in broadcast signals and there will not a lot of interactive digital TV content without a standard for viewer profile data.

Therefore, there is a need in the art for improved interactive digital television systems. In particular, there is a need for an interactive digital television capable of modifying and augmenting viewer profile information associated with the interactive digital television content without the development of a fixed fully standardized protocol.

SUMMARY OF THE INVENTION

To address the above-discussed deficiencies of the prior art, it is a primary object of the present invention to provide an apparatus for updating a viewer profile stored in a digital television device. According to an advantageous embodiment of the present invention, the apparatus comprises: 1) receiver circuitry capable of receiving audio-video data packets associated with a plurality of incoming television signals and extracting therefrom at least one data request data packet containing a first data request operable to retrieve a first requested profile datum from the stored viewer profile; and 2) an update controller capable of receiving the at least one data request data packet from the receiver circuitry and determining if the first requested profile datum is present in the viewer profile, wherein the update controller is further capable, in response to a determination that the first requested profile datum is not present in the stored viewer profile, of displaying on an associated television screen information related to the first requested profile datum.

According to one embodiment of the present invention, the update controller is further capable of receiving viewer input commands related to the first requested profile datum operable to cause the update controller to add the first requested profile datum to the stored viewer profile.

According to another embodiment of the present invention, the apparatus further comprises a memory coupled to the update controller, wherein the update controller creates in the memory a first missed request record associated with the first data request indicating that the first requested profile datum was not present in the stored viewer profile when the first data request was received.

According to still another embodiment of the present invention, the receiver circuitry is further capable of extracting from the plurality of incoming television signals additional data request data packets containing subsequent data requests, each of the subsequent data requests operable to retrieve the first requested profile datum from the stored viewer profile, and wherein the update controller receives the additional data request data packets from the receiver circuitry and, for the each subsequent data request, determines if the first requested profile datum is present in the stored viewer profile.

According to yet another embodiment of the present invention, the first missed request record comprises a missed request count, and wherein the update controller, in response to a determination for the each subsequent data request that the first requested profile datum is not present in the stored viewer profile, increments the missed request count after the determination for the each subsequent data request.

According to a further embodiment of the present invention, the update controller compares the missed request count to a predetermined threshold and, in response to a determination that the missed request count exceeds the predetermined threshold, displays the information related to the first requested profile datum.

According to a still further embodiment of the present invention, the update controller is further capable of receiving viewer input commands related to the first requested profile datum operable to cause the update controller to add the first requested profile datum to the stored viewer profile.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. In particular, a controller may comprise one or more data processors, and associated input/output devices and memory, that execute one or more application programs and/or an operating system program. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged set-top box (STB) and broadcast facility.

Figure 1:
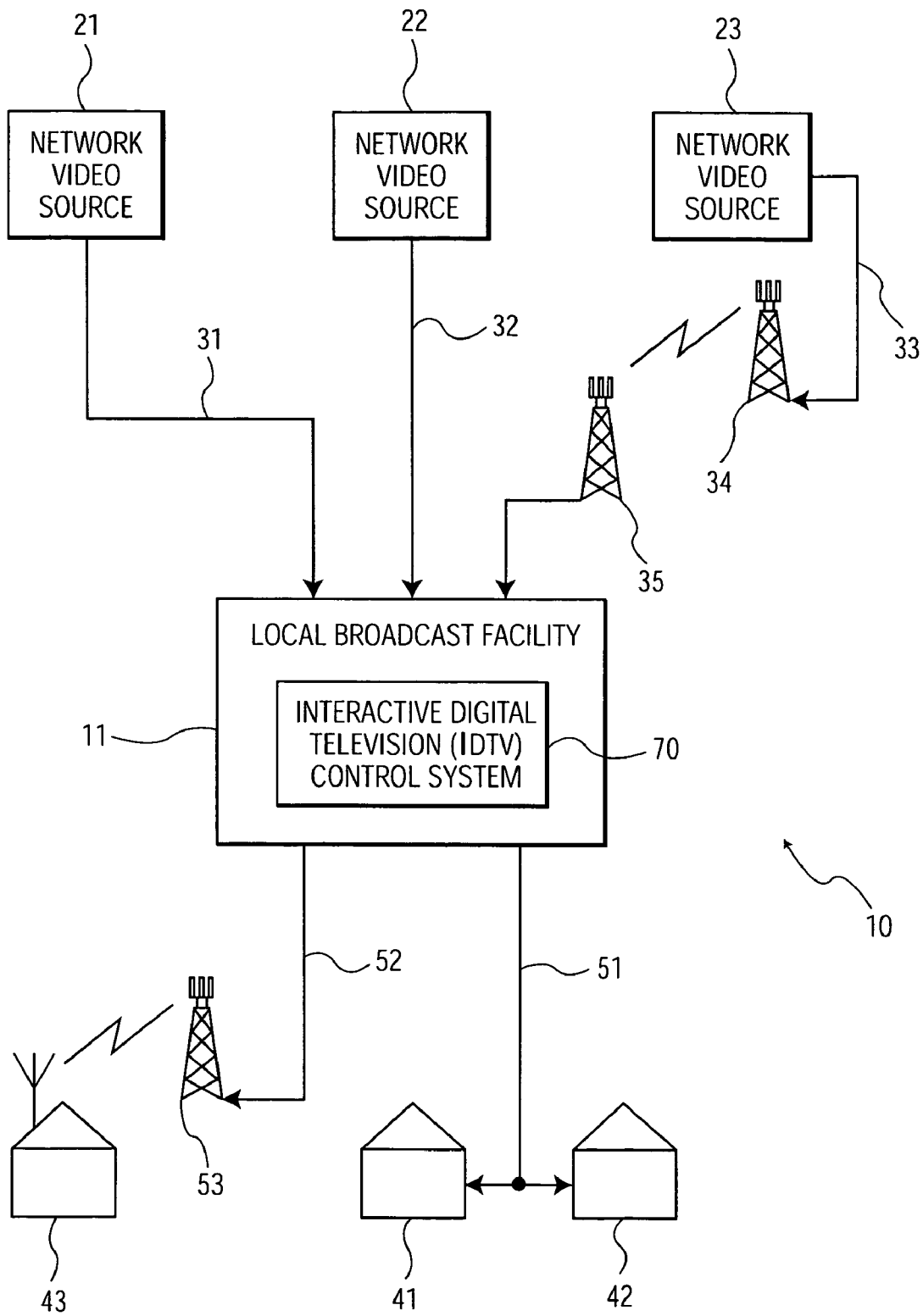
FIG. 1 illustrates exemplary television broadcast system according to one embodiment of the present invention.

FIG. 1 illustrates exemplary television broadcast system 10 according to one embodiment of the present invention. Television broadcast system 10 comprises local broadcast facility 11, which receives one or more digital video transport streams from each of network video sources 21–23. Local broadcast facility 10 may receive these digital video transport streams from wireline communication links or from wireless communication links. For example, local broadcast facility 10 receives one or more digital video transport streams from network video source 21 via wireline communication link 31 and receives one or more digital video transport streams from network video source 22 via wireline communication link 32.

Local broadcast facility 11 also comprises base transceiver stations 34 and 35, which wirelessly transmit one or more digital video transport streams from network video source 23 to local broadcast facility 11. In an exemplary embodiment, network video source 23 may transmit the digital video transport streams via communication line 33 to base transceiver station 34, which is part of a local multipoint distribution system (LMDS) network. In an LMDS network, a microwave link is used to transmit the digital video transport stream from base transceiver station 34 to base transceiver station 35.

Local broadcast facility 11 transmits the digital video transport streams to subscriber locations 41-43, which may include both private residences and business locations. If local broadcast facility 11 is part of a cable television system, local broadcast facility 11 may transmit one or more outbound digital video transport streams to subscriber locations 41 and 42 via communication wireline 51. Communication wireline 52 carries one or more outbound digital video transport streams from local broadcast facility 11 to transmitter 43, which wirelessly transmits the outbound digital video transport streams to subscriber location 43.

Each of the digital video transport streams received by and transmitted by local broadcast facility are carried in a 6 MHz broadcast channel. A transport stream usually contains several virtual channels, with each virtual channel containing a program. The program carried in a virtual channel is what a viewer sees on a signal television channel, such as a movie, a newscast, and a weather channel. Normally, each virtual channel is allocated a fixed bandwidth, such as 3 Megabits per second (Mbps).

Local broadcast facility 11 also comprises interactive digital television (IDTV) control system 70, which communicates bidirectionally with associated monitoring circuitry in set-top boxes in subscriber locations in order to, for example, display customized commercials during a television program. According to an advantageous embodiment of the present invention, IDTV control system 70 may insert audio-video data packets for several commercials into the audio-video data packets of a single television program. In the subscriber location, the monitoring circuitry uses viewer profile information resident in the subscriber terminal device (i.e., set-top box, television set) to select only one of the commercials for play during a commercial break in the television program. Thus, IDTV control system 70 can cause customized commercials to be displayed on the subscriber television based on demographic information stored in the viewer profile.

In the descriptions of the present invention that follow, the associated subscriber monitoring circuitry that communicates bidirectionally with IDTV control system 70 is implemented in a set-top box that functions as a disk-based video recorder. Those skilled in the art will understand that this is by way of example only and should not be construed so as to limit the scope of the present invention. In alternate embodiments of the present invention, the subscriber monitoring circuitry may be implemented in a television set, in a conventional video cassette recorder (VCR), in a cable TV converter box, or in a satellite dish control box.

Figure 2:
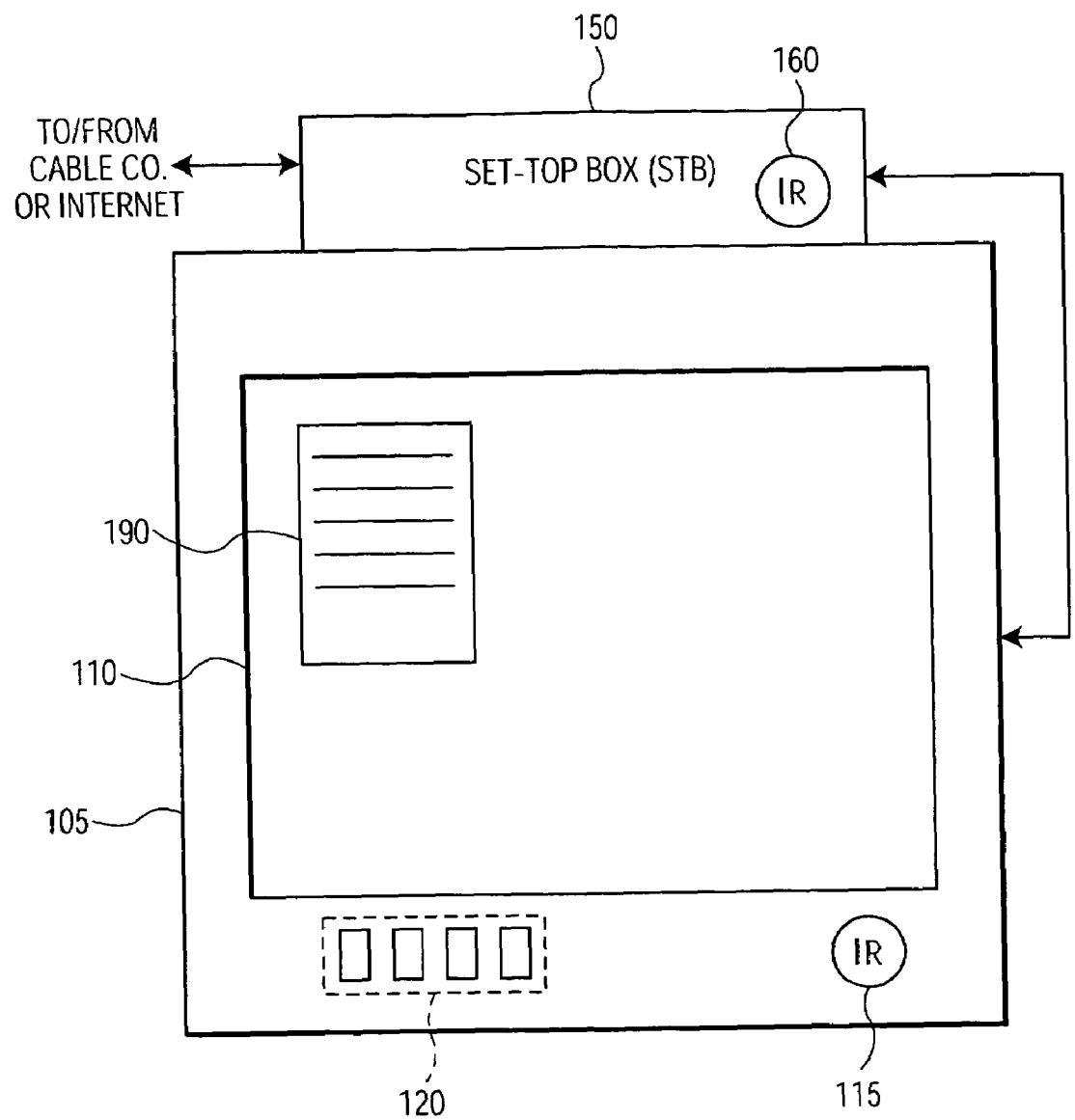
FIG. 2 illustrates an exemplary set-top box (STB) and a television set according to one embodiment of the present invention.

FIG. 2 illustrates exemplary set-top box (STB) 150 and television set 105 according to one embodiment of the present invention. Set-top box 150 receives incoming television signals from local broadcast facility 11, which may be a cable television service provider (Cable Co.) or an Internet service provider (ISP) and transmits a viewer-selected channel to television set 105.

In RECORD mode, set-top box 150 may demodulate an incoming radio frequency (RF) television signal to produce a baseband video signal that is recorded and stored on a storage medium within or connected to set-top box 150. In PLAY mode, set-top box 150 reads a stored baseband video signal (i.e., program) selected by the user from the storage medium and transmits it to television set 105.

For example, if set-top box 150 is a disk drive-based device, such as a ReplayTV™ recorder or a TiVO™ recorder, set-top box 150 stores and retrieves the incoming television signals to and from a computer magnetic hard disk (rather than a magnetic cassette tape). In still other embodiments, set-top box 150 may store and retrieve from a local read/write (R/W) digital versatile disk (DVD) or R/W CD-ROM. Thus, the local storage medium may be fixed (i.e., hard disk drive) or removable (i.e., DVD, CD-ROM).

Set-top box 150 comprises infrared (IR) sensor 160 that receives commands (such as Channel Up, Channel Down, Volume Up, Volume Down, Record, Play, Fast Forward (FF), Reverse, and the like) from a remote control device operated by the viewer. Television set 105 is a conventional television comprising screen 110, infrared (IR) sensor 115, and one or more manual controls 120 (indicated by a dotted line). IR sensor 115 also receives commands (such as volume up, volume down, power ON/OFF) from a remote control device operated by the viewer.

It should be noted that set-top box 150 is not limited to receiving a particular type of incoming television signal from a particular type of source. As noted above, the external source may be a cable service provider, a conventional RF broadcast antenna, a satellite dish, or an Internet connection. Thus, the incoming signal may be a digital signal, an analog signal, or Internet protocol (IP) packets.

However, for the purposes of simplicity and clarity in explaining the principles of the present invention, the descriptions that follow shall generally be directed to an embodiment in which set-top box 150 receives incoming television signals (analog and/or digital) from a cable service provider. Nonetheless, those skilled in the art will understand that the principles of the present invention may readily be adapted for use with wireless broadcast television signals, an incoming stream of IP packets containing MPEG data, and the like.

Figure 3:
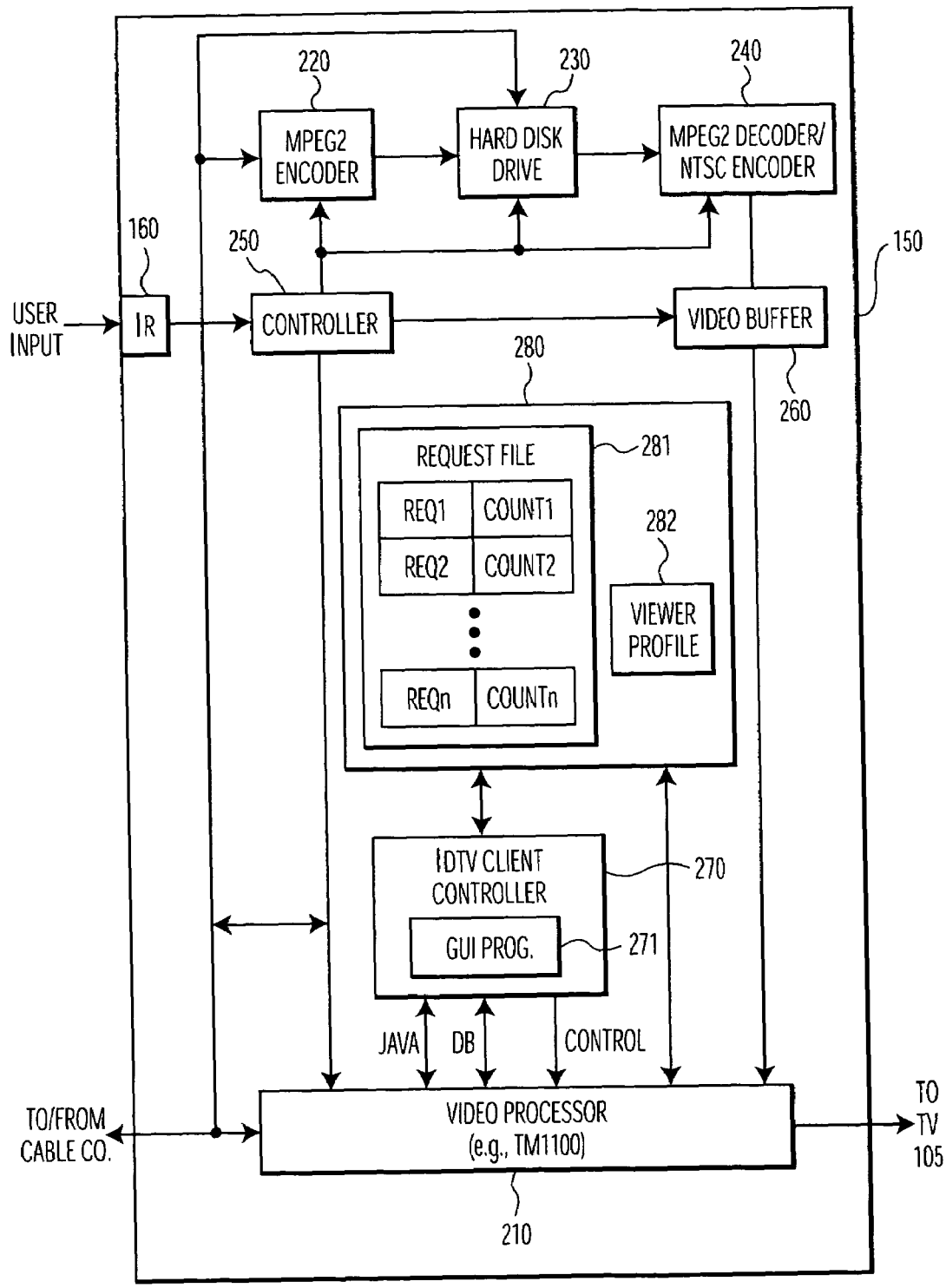
FIG. 3 illustrates in greater detail the exemplary set-top box according to one embodiment of the present invention.

FIG. 3 illustrates exemplary set-top box 150 in greater detail according to one embodiment of the present invention. Set-top box 150 comprises JR sensor 160, video processor 210, MPEG2 encoder 220, hard disk drive 230, MPEG2 decoder/ATSC encoder 240, controller 250, video buffer 260, interactive digital television (IDTV) client controller 270 and memory 280. In an advantageous embodiment of the present invention, IDTV client controller 270 comprises a data processor and an associated memory that stores graphical user interface (GUI) program 271. Memory 280 stores request file 281 and viewer profile 282.

Controller 250 directs the overall operation of set-top box 150, including View mode, Record mode, Play mode, Fast Forward (FF) mode, and Reverse mode, among others. In View mode, controller 250 causes the incoming television signal from the cable service provider to be demodulated and processed by video processor 210 and transmitted to television set 105, without storing or retrieving from hard disk drive 230. Video processor 210, which may be, for example, a TriMedia (TM) 1100 media processor, contains radio frequency (RF) front-end circuitry for receiving incoming television signals from the cable service provider, tuning to a user-selected channel, and converting the selected RF signal to a baseband television signal (e.g., super video signal) suitable for display on television set 105. Video processor 210 also is capable of receiving a conventional ATSC signal from MPEG2 decoder/ATSC encoder 240 (after buffering in video buffer 260) during Play mode and transmitting baseband television signal (e.g., super video signal) to television set 105.

In Record mode, controller 250 causes the incoming television signal to be stored on hard disk drive 230. Under the control of controller 250, MPEG2 encoder 220 receives the incoming television signal from the cable service provider and converts the received RF signal to MPEG-2 format for storage on hard disk drive 230. Alternatively, if set-top box 150 is coupled to a source that is transmitting MPEG-2 data, the incoming MPEG-2 data may bypass MPEG2 encoder 220 and be stored directly on hard disk drive 230. In Play mode, controller 250 directs hard disk drive 230 to stream the stored television signal (i.e., program) to MPEG2 decoder/ATSC encoder 240, which converts the MPEG2 data from hard disk drive 230 to, for example, a super video (S-Video) signal that is buffered in video buffer 260 before video processor 210 transmits it to television set 105.

It should be noted that the choice of the MPEG2 standard for MPEG2 encoder 220 and MPEG2 decoder/ATSC encoder 240 is by way of illustration only. In alternate embodiments of the present invention, the MPEG encoder and decoder may comply with one or more of the MPEG-1, MPEG-2, MPEG-4, and MPEG-7 standards.

For the purposes of this application and the claims that follow, hard disk drive 230 is defined to include any mass storage device that is both readable and writable, including conventional magnetic disk drives and optical disk drives for read/write digital versatile disks (DVD-RW), re-writable CD-ROMs, VCR tapes and the like. In fact, hard disk drive 230 need not be fixed in the conventional sense that is permanently embedded in set-top box 150. Rather, hard disk drive 230 includes any mass storage device that is dedicated to set-top box 150 for the purpose of storing recorded video programs. Thus, hard disk drive 230 may include an attached peripheral drive or removable disk drives (whether embedded or attached), such as a juke box device that holds read/write DVDs or re-writable CD-ROMs. Furthermore, in an advantageous embodiment of the present invention, hard disk drive 230 may include external mass storage devices that set-top box 150 may access and control via a network connection (e.g., Internet protocol (IP) connection) including, for example, a disk drive in the user's home personal computer (PC) or a disk drive on a server at the user's Internet service provider (ISP).

The present invention allows the personal data in viewer profile 282 to be built up over time without an explicit a priori standard. IDTV control system 70, in addition to transmitting audio-video data packets for a television program and audio-video data packets for numerous commercials to video processor 210, also is capable of transmitting one or more Java applications and database file(s) in the data packets that are interspersed with the audio-video data packets. The Java application and the database files(s) are separated (demultiplexed) from the audio-video data packets by video processor 210 and are transferred to IDTV client controller 270. IDTV client controller 270 can then execute the Java application(s) in order to carry out some function requested by the content creator.

According to an advantageous embodiment of the present invention, IDTV client controller 270 may use conventional Application Program Interfaces (APIs) that provide data field flexibility. Thus, the nature of viewer profile 282 data would grow over time according to the responses and actions of the viewer. The content creator would use a standard API to create an application in the audio-video data packets that could be used to get information from viewer profile 282 via IDTV client controller 270 in order to better determine content to be displayed. By way of example, the application executed by IDTV client controller 270 may analyze demographic information retrieved from viewer profile 282 and, in response, transmit control signals to video processor 210 causing it to display a selected one of several commercials received by video processor 210. Thus, the data in viewer profile 282 may be used to customize the commercials seen on television set 105.

The data in viewer profile 282 is initially set up by the viewer, who uses a remote control to interact with GUI program 271. GUI program 271 causes video processor 210 to display overlay window 190 on screen 110 of television set 105. Window 190 may be a drop-down or pop-up window. The viewer enters data or selects options in window 190 in order to enter viewer data, such as age, gender, credit card number, address (including ZIP code). In an alternate embodiment in which an advanced two-way remote control is used, window 190 may be displayed on a screen on the two-way remote control.

However, the application received by IDTV client controller 270 may request information for data fields that do not exist. Consider an example in which the audio-video stream display an advertisement for a ring. During the display, the corresponding Java application looks into viewer profile 282 to see if there exists data fields called "ring size," "home address," and "method of payment." In the example, the viewer had previously entered his home address and his method of payment (i.e., credit card) in viewer profile 282. However, ring size has not been entered into viewer profile 282 by the viewer. The viewer has further set up viewer profile 282 to defer filling in requested data elements. All the viewer sees is the audio-video portion of the ring commercial. The Java application executed by IDTV client controller 270 starts and stops without interaction.

At some later time, the viewer may enter the set-up mode via GUI program 271 and ask IDTV client controller 270 display in window 190 all requested data fields (or elements) that were not satisfied by IDTV client controller 270. If the viewer decides that he or she wants to receive offers for rings, the viewer may enter a value for "ring size". The next time the ring commercial is transmitted to video processor 210, IDTV client controller 270 displays the full interactive dialog, wherein the content creator can offer the viewer the ring in the right size delivered to his address for a set price. If the viewer approves the transaction, the viewer may use the remote control to key in his credit card PIN number. Thereafter, IDTV client controller 270 transmits the data for the complete transaction back to IDTV control system 70.

This scenario could be expanded to any type of requested data. To control the amount of data requests displayed to the viewer, IDTV client controller 270 may track the number of times particular data requests are made and store this information in memory 280 For example, requests for the data field "ring size" may be stored in the memory location REQ1 in memory 280, requests for the data field "car type" may be stored in the memory location REQ2, and so forth. The number of times "ring size" was requested is maintained in COUNT1 memory location, the number of times "car type" was requested is maintained in COUNT2 memory location, and so forth.

Until a particular data field (element) is requested more than a threshold number of times, IDTV client controller 270 does not proceed with any interaction. Likewise, viewer profile 282 and IDTV client controller 270 could be configured so that full editing of the data fields is permitted and the level of protection assigned to each one. For instance, data elements could be tagged with "provide to local application," "provide to authorized application vendor," "never provide," "provide only with viewer confirmation," and the like.

As noted above, IDTV client controller 270 may use data elements in viewer profile 282 to determine a best-suited commercial that meets the viewer's interest. The viewer may specify a car type and/or brand that they might consider or provide basic demographics to better tune commercials to their interests. These data elements (such as "number of children," "number of cars," "number of wage earners," "annual salary," etc.) could be tagged to be used only within the terminal device for the purposes of local application information. Alternatively, they could be provided on a limited and selected basis to certain vendors—all under the devices control.

By using the above-described method, the data structures in viewer profile 282 may be incrementally augmented under viewer control. Content creators could obtain feedback about popular data fields by noting those that are part of real purchases performed by IDTV client controller 270 (assuming a return channel for full purchase order information.

Figure 4:
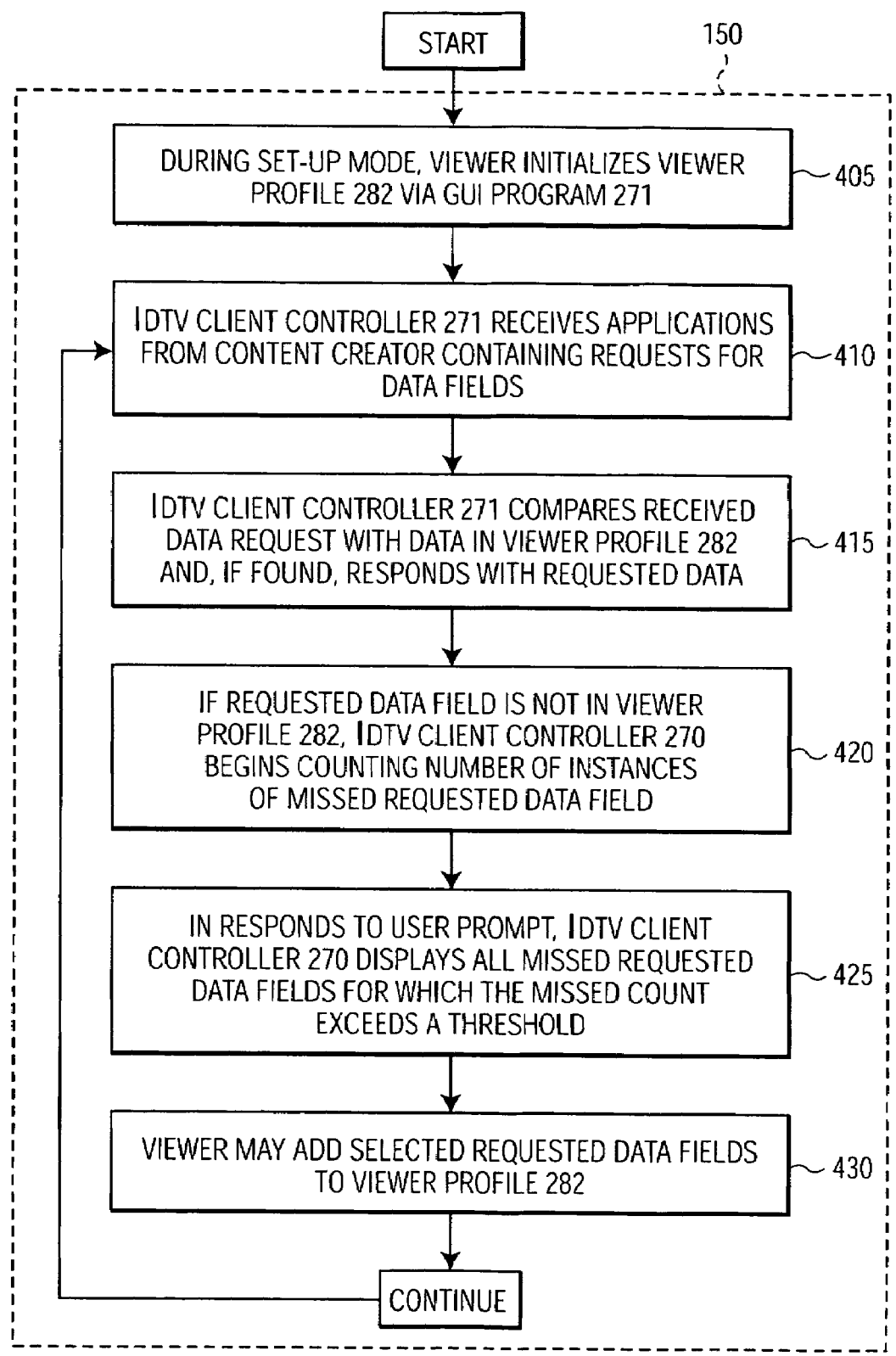
FIG. 4 is a flow diagram illustrating the operation of the exemplary set-top box according to one embodiment of the present invention.

FIG. 4 depicts flow diagram 400, which illustrates the operation of exemplary set-top box 150 according to an advantageous embodiment of the present invention. During set-up mode, the viewer initializes viewer profile 282 via GUI program 271 (process step 405). During normal television viewing IDTV client controller 271 receives applications from a content creator containing requests for data fields in viewer profile 282 (process step 405). Requests are made via an agreed Application Program Interface (API) to IDTV client controller 270. IDTV client controller 271 compares the received data request with data in viewer profile 282 and, if found, responds with the requested data (process step 405). If a requested data field is not found in viewer profile 282, 1DTV client controller 270 begins counting the number of instances of the missed requested data field (process step 405). In response to a viewer prompt, IDTV client controller 270 displays all missed requested data fields for which the missed count exceeds a pre-defined threshold (process step 405). The viewer may later add selected requested data fields to viewer profile 282 (process step 405).

Although the present invention has been described in detail, those skilled in the art should understand that they can make various changes, substitutions and alterations herein without departing from the spirit and scope of the invention in its broadest form.

What is claimed is:

1. An apparatus for updating a viewer profile stored in a digital television device, said apparatus comprising:
    receiver circuitry capable of receiving audio-video data packets associated with a plurality of incoming television signals and extracting from said plurality of incoming television signals at least one data request data packet containing a first data request operable to retrieve a first requested profile datum from said stored viewer profile;
    an update controller capable of receiving said at least one data request data packet from said receiver circuitry and determining if said first requested profile datum is present in said viewer profile, said update controller being further capable, in response to a determination that said first requested profile datum is not present in said stored viewer profile, of displaying information related to said first requested profile datum; and a memory coupled to said update controller, wherein said update controller creates in said memory a first missed request record associated with said first data request indicating that said first requested profile datum was not present in said stored viewer profile when said first data request was received said first missed request record including a missed request count such that said update controller increments said missed request count in response to a determination that said first requested profile datum is not present in said stored viewer profile.

2. The apparatus as set forth in claim 1, wherein said update controller is further capable of receiving viewer input commands related to said first requested profile datum operable to cause said update controller to add said first requested profile datum to said stored viewer profile.

3. The apparatus as set forth in claim 1, wherein said update controller compares said missed request count to a predetermined threshold and, in response to a determination tat said missed request count exceeds said predetermined threshold, displays said information related to said first requested profile datum.

4. The apparatus as set forth in claim 3, wherein said update controller is further capable of receiving viewer input commands related to said first requested profile datum operable to cause said update controller to add said first requested profile datum to said stored viewer profile.

5. The apparatus as set forth in claim 4, wherein said digital television device is in a television set.

6. The apparatus as set forth in claim 4, wherein said digital television device is a set-top box operable to control an associated television set.

7. The apparatus as set forth in claim 4, wherein said digital television device is a video recorder.

8. A method for updating a viewer profile stored in a digital television device, the method comprising:

receiving audio-video data packets associated with a plurality of incoming television signals;

extracting from said plurality of incoming television signals at least one data request data packet containing a first data request operable to retrieve a first requested profile datum from the stored viewer profile;

determining if the first requested profile datum is present in the viewer profile;

in response to a determination that the first requested profile datum is not present in the stored viewer profile, displaying information related to the first requested profile datum;

creating a first missed request record associated with the first data request indicating that the first requested profile datum was not present in the stored viewer profile when the first data request was received, the first missed request record including a missed request count which is incremented in response to a determination for the each subsequent data request that the first requested profile datum is not present in the stored viewer profile after the determination for the each subsequent data request.

9. The method as set forth in claim 8 further comprising the step of receiving viewer input commands related to the first requested profile datum operable to add the first requested profile datum to the stored viewer profile.

10. The method as set forth in claim 8, further comprising:

comparing the missed request count to a predetermined threshold; and in response to a determination that the missed request count exceeds the predetermined threshold, displaying the information related to the first requested profile datum.

11. The method as set forth in claim 10, further comprising receiving viewer input commands related to the first requested profile datum operable to add the first requested profile datum to the stored viewer profile.

* * * * *